United States Patent
Nakazawa

(10) Patent No.: US 12,106,463 B2
(45) Date of Patent: Oct. 1, 2024

(54) ANALYSIS APPARATUS

(71) Applicant: Synca-Outfit NA co., Ltd., Tokyo (JP)

(72) Inventor: Hideta Nakazawa, Tokyo (JP)

(73) Assignee: Synca-Outfit NA co., Ltd., Tokyo (JP)

( * ) Notice: Subject to any disclaimer, the term of this patent is extended or adjusted under 35 U.S.C. 154(b) by 430 days.

(21) Appl. No.: 17/397,895

(22) Filed: Aug. 9, 2021

(65) Prior Publication Data

US 2022/0156913 A1 May 19, 2022

(30) Foreign Application Priority Data

Nov. 17, 2020 (JP) .................................. 2020-190640

(51) Int. Cl.
| | |
|---|---|
| *G06T 7/00* | (2017.01) |
| *F04D 15/00* | (2006.01) |
| *G06T 5/00* | (2024.01) |
| *G06T 7/62* | (2017.01) |
| *G06T 7/70* | (2017.01) |

(52) U.S. Cl.
CPC ............ *G06T 7/0004* (2013.01); *F04D 15/00* (2013.01); *G06T 5/00* (2013.01); *G06T 7/62* (2017.01); *G06T 7/70* (2017.01); *G06T 2207/30108* (2013.01)

(58) Field of Classification Search
CPC ........... G06T 7/0004; G06T 7/62; G06T 7/70; G06T 5/001; G06T 2207/30108; F04D 15/00; G06V 10/225; G06V 10/14; G06V 20/64; G06V 2201/06; B02C 23/18; B02C 18/16

See application file for complete search history.

(56) References Cited

U.S. PATENT DOCUMENTS

| | | | | |
|---|---|---|---|---|
| 2016/0255281 | A1* | 9/2016 | Shimahashi | ....... H04N 1/00244 348/239 |
| 2017/0308745 | A1* | 10/2017 | Jain | ...................... G06V 30/418 |
| 2017/0327330 | A1* | 11/2017 | Aoki | .................... B65H 3/5261 |
| 2019/0114795 | A1* | 4/2019 | Rajvanshi | ................. G06T 7/97 |
| 2020/0097748 | A1* | 3/2020 | Zou | ...................... G06V 10/449 |

FOREIGN PATENT DOCUMENTS

| | | | | |
|---|---|---|---|---|
| CN | 108009986 | A * | 5/2018 | .......... G06T 3/4038 |
| JP | 5809373 | | 11/2015 | |
| JP | 2020062755 | A * | 4/2020 | .............. B41J 11/00 |

OTHER PUBLICATIONS

Justino, Edson, Luiz S. Oliveira, and Cinthia Freitas. "Reconstructing shredded documents through feature matching." Forensic science international 160, No. 2-3 (2006): 140-147. (Year: 2006).*

* cited by examiner

*Primary Examiner* — Edward F Urban
*Assistant Examiner* — Wassim Mahrouka
(74) *Attorney, Agent, or Firm* — Alley IP

(57) ABSTRACT

An image processing system includes a housing that forms a passage through which paper pieces pass, imaging units that capture images of the paper pieces passing through the housing, and an AI image processing apparatus that restores a restoration target on the basis of the images captured by the imaging unit so that the contents of the restoration target become viewable.

3 Claims, 6 Drawing Sheets

T1 DATA MANAGEMENT TABLE

| ID | FIRST SIDE | SECOND SIDE | THIRD SIDE | FOURTH SIDE | STATUS | FILE NAME |
|---|---|---|---|---|---|---|
| ···xx·· | 124584548.9nm, | ... | ... | ... | UNPROCESSED | xx.jpg |
| ···yy·· | ... | ... | ... | ... | PROCESSED | yy.jpg |
| ... | ... | ... | ... | ... | ... | ... |

FIG. 5

ANALYSIS APPARATUS

RELATED APPLICATIONS

This application claims priority under 35 U.S.C. § 119 to Japanese Application 2020-190640, filed Nov. 17, 2020, which is incorporated by reference herein in its entirety.

FIELD

The embodiment discussed herein relates to an analysis apparatus.

BACKGROUND

A method for evaluating the shredding performance of a shredder has been known. For example, to evaluate the shredding performance of a shredder, a shredder performance evaluation method has been known, which shreds a shredding object on which letters are drawn in desired font size, in shredding size based on the performance of the shredder to thereby make shredded pieces for visual check and displays the shredded pieces for visual check and the font size of the letters on a performance evaluation display.

For this performance evaluation method, a technique for restoring, as a shredding object model, the shredding object back to before the shredding has been known, which enlarges the vertical and horizontal dimensions of full-sized shredded pieces for visual check according to the shredding dimensions to thereby produce enlarged shredded piece models and combines and arranges the plurality of enlarged shredded piece models at their predetermined positions.

Please see, for example, Japanese Patent No. 5809373.

Japanese Patent No. 5809373 teaches a theoretical restoration method. For example, Japanese Patent No. 5809373 teaches in paragraph [0033] and FIG. 14 a restoration method that involves combining and arranging shredded models but does not disclose or suggest how to combine what have been shredded.

The above describes pieces of paper shredded by a shredder. Please note that the same problem as above arises in other fields of restoring an object once it has been cut.

SUMMARY

According to one aspect, there is provided a restoration apparatus including: a passage that allows cut-up pieces to pass therethrough, the cut-up pieces being made by cutting up a restoration target; an imaging unit that captures images of the cut-up pieces passing through the passage; a restoration unit that restores the restoration target, based on the images captured by the imaging unit, so that contents of the restoration target become viewable; and a leading unit that blows air to lead the cut-up pieces one by one to the passage, wherein the restoration unit measures dimensions of the cut-up pieces, based on the images captured by the imaging unit, detects cut-up pieces to be placed next to each other, based on a result of the measurement, and determines whether a letter, an image, or a pattern drawn on the cut-up pieces placed next to each other has appropriate continuity.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a view for explaining an example of information that is stored in a storage unit.

DETAILED DESCRIPTION

Figure 1:
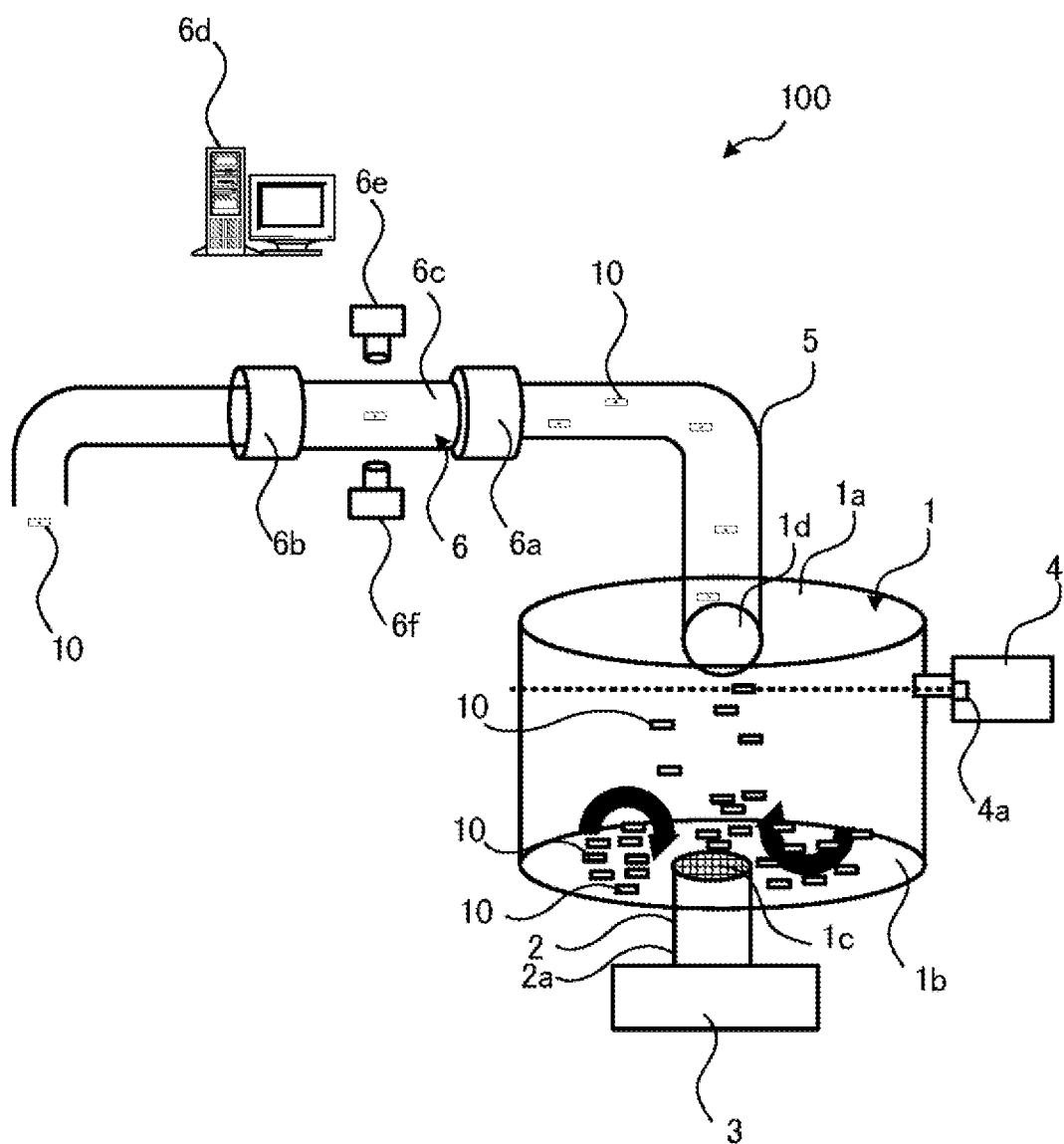
FIG. 1 illustrates an image processing system according to one embodiment.

Hereinafter, an image processing system according to one embodiment will be described in detail with reference to the accompanying drawings.

For easy understanding of the embodiment, the position, size, shape, range, and others of each component illustrated in the drawings may not represent the actual position, size, shape, range, and others. Therefore, the embodiment is not limited to the illustrated positions, sizes, shapes, ranges, and others.

Elements that are each expressed in a singular form in the embodiment may be plural in use, expect otherwise particularly specified in writing.

Embodiment

FIG. 1 illustrates an information processing system according to one embodiment.

In the following description, the term "up" refers to the upper side of sheets, whereas the term "down" refers to the lower side of the sheets.

The image processing system 100 of the embodiment includes a box case 1, a duct 2, a first air blower 3, a laser light emitting device 4, a duct 5, and a reading unit 6.

The box case 1 has a lid 1a. Covered with the lid 1a, the box case 1 has a closed space inside.

The box case 1 has a plurality of cut paper pieces 10 inside. The paper pieces 10 are an example of cut-up pieces made by cutting up a restoration target. In this case, the restoration target may be one paper sheet, a plurality of paper sheets, a book, or the like, for example.

For example, the paper pieces 10 of the embodiment are made through cutting using a shredder, not illustrated, and the paper pieces 10 may have different shapes or almost the same shape. The paper pieces 10 may have different sizes or almost the same size. A method of putting the paper pieces 10 in the box case 1 is not limited to any particular method.

A filter 1c that allows air to pass therethrough but does not allow the paper pieces 10 to pass therethrough is disposed at the bottom 1b of the box case 1. The duct 2 is disposed below the filter 1c, and the outlet of the first air blower 3 is located at an end 2a of the duct 2.

The first air blower 3 has a function of controlling the air volume. When the first air blower 3 operates, the paper pieces 10 fly up (move upward).

The laser light emitting device 4 includes an imaging unit 4a. The imaging unit 4a captures an image at an imaging position (schematically indicated by a dotted line in FIG. 1). The imaging position is slightly below an opening 1d provided above the side surface of the box case 1, for example. The imaging position may have a fixed vertical width (for example, approximately 10 cm).

The duct 5 that extends to the side or upward is disposed at the opening 1d. The laser light emitting device 4 emits laser light to a paper piece 10 captured by the imaging unit 4a to make a hole (laser hole) of predetermined size in the paper piece 10. This lightens the paper piece 10, which allows the paper piece 10 to enter the duct 5 easier.

Figure 2:
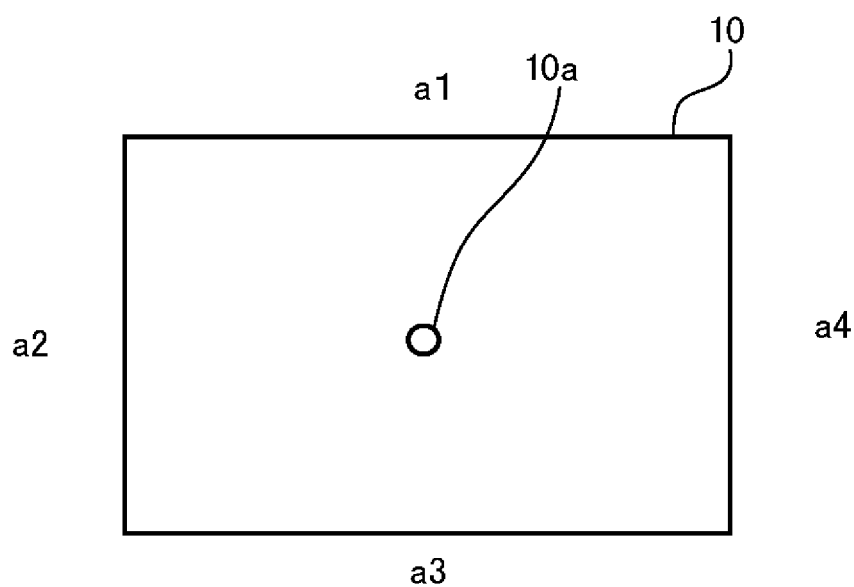
FIG. 2 illustrates an example of a piece of paper in which a laser hole is made.

FIG. 2 illustrates an example of a paper piece in which a laser hole is made.

The paper piece 10 illustrated in FIG. 2 has a rectangle with sides a1, a2, a3, and a4, for example, and has a laser hole 10a at a part thereof.

The reading unit 6 is provided at an end of the duct 5.

The reading unit 6 has a second air blower 6a, a third air blower 6b, and a column housing 6c. The housing 6c is a part of a passage through which the paper pieces 10 pass. The second air blower 6a and the third air blower 6b are disposed at the opposite ends of the housing 6c, respectively.

The second air blower 6a blows air in a direction from the duct 5 toward the housing 6c. The blowing leads the paper pieces 10, which has passed through the duct 5, one by one to the housing 6c and then allows the paper pieces 10 to pass through the housing 6c. Although not illustrated, a device that carries the paper pieces 10 one by one to the second air blower 6a may be disposed on the inlet side of the second air blower 6a. In addition, the second air blower 6a may have a function of sucking the paper pieces 10 with laser holes 10a into the duct 5.

The housing 6c is made of a transparent resin, for example.

The reading unit 6 includes an AI image processing apparatus 6d and imaging units 6e and 6f. These two imaging units are provided in the present embodiment, but the number of imaging units is not particularly limited.

The housing 6c provides an imaging zone in which images of the paper pieces 10 are captured. The imaging units 6e and 6f capture images of the paper pieces 10 passing through the housing 6c in different angles. By doing so, the images of both sides of each paper piece 10 are obtained.

The imaging units 6e and 6f each send the captured images of the paper pieces 10 to the AI image processing apparatus 6d with a wired or wireless communication means. In the case where cut-up pieces have cubic shapes, the images of the six sides of the cut-up pieces may be captured, although it is not illustrated.

The AI image processing apparatus 6d measures the lengths of the four sides a1, a2, a3, and a4 of each paper piece 10, for example, up to a nanometer scale on the basis of an image of the paper piece 10 received from the imaging unit 6e or 6f. In addition, the AI image processing apparatus 6d reads letters and patterns drawn on the paper piece 10 on the basis of the image of the paper piece 10 received from the imaging unit 6e or 6f.

The third air blower 6b blows air to exhaust the paper pieces 10 having passed through the housing 6c outside the housing 6c.

Figure 3:
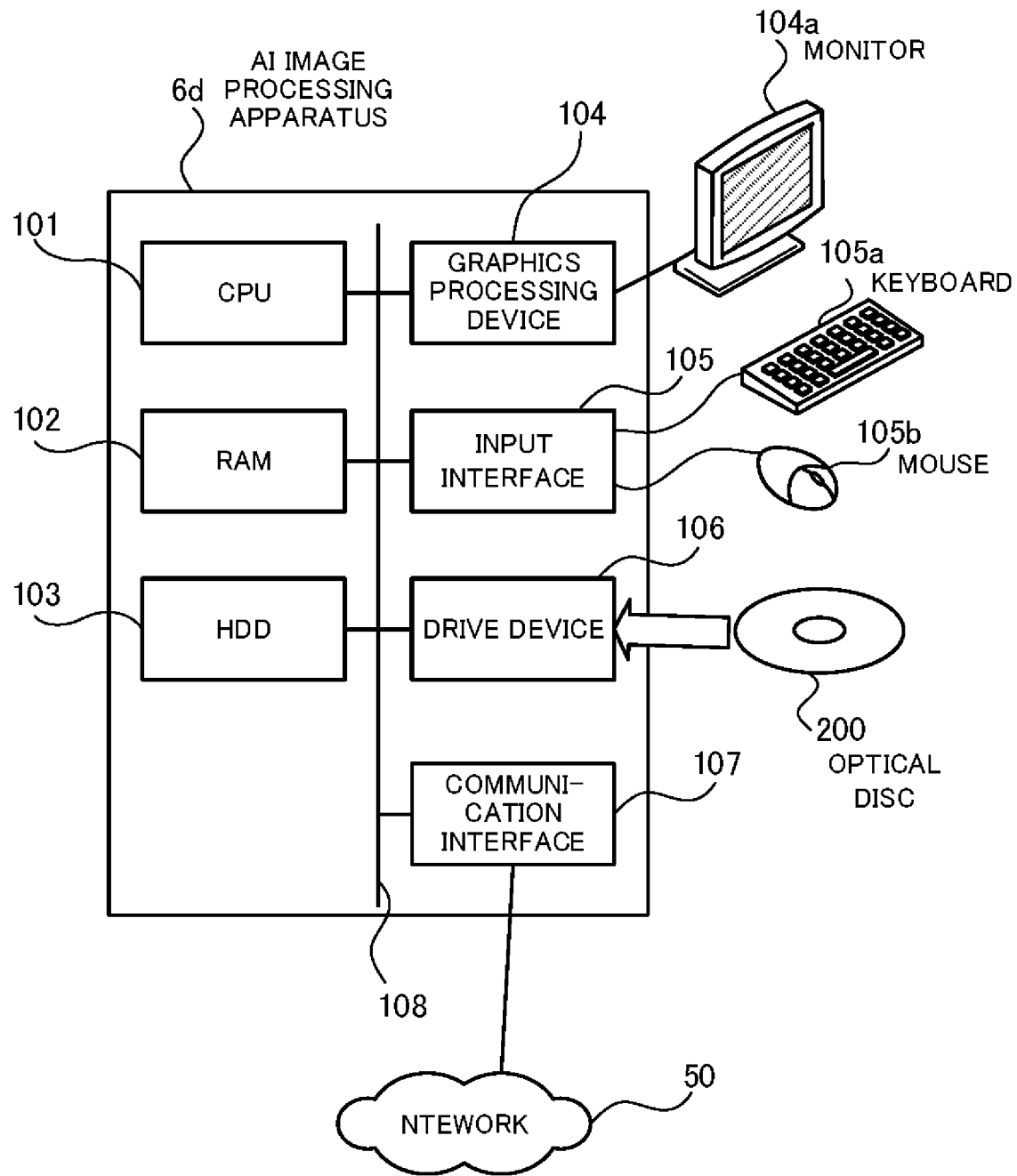
FIG. 3 is a view illustrating the hardware configuration of an AI image processing apparatus according the embodiment.

FIG. 3 illustrates the hardware configuration of the AI image processing apparatus according to the embodiment.

The AI image processing apparatus 6d is entirely controlled by a central processing unit (CPU) 101. A random access memory (RAM) 102 and a plurality of peripheral devices are connected to the CPU 101 via a bus 108.

The RAM 102 is used as a main memory of the AI image processing apparatus 6d. The RAM 102 temporarily stores therein at least part of operating system (OS) programs and application programs that are executed by the CPU 101. In addition, the RAM 102 stores therein various kinds of data to be used by the CPU 101 in processing.

Connected to the bus 108 are a hard disk drive (HDD) 103, a graphics processing device 104, an input interface 105, a drive device 106, and a communication interface 107.

The HDD 103 magnetically writes and reads data from and to a built-in disk. The HDD 103 is used as an secondary storage device of the AI image processing apparatus 6d. The HDD 103 stores therein OS programs, application programs, and various kinds of data. In this connection, a semiconductor memory device such as a flash memory may be used as the secondary storage device.

A monitor 104a is connected to the graphics processing device 104. The graphics processing device 104 displays images on the screen of the monitor 104a in accordance with instructions from the CPU 101. Examples of the monitor 104a include cathode ray tube (CRT) displays, liquid crystal displays, and others.

A keyboard 105a and a mouse 105b are connected to the input interface 105. The input interface 105 gives signals received from the keyboard 105a and mouse 105b to the CPU 101. In this connection, the mouse 105b is one example of a pointing device and another pointing device may be used. Other pointing devices include touch panels, tablets, touch pads, track balls, and others, for example.

The drive device 106 reads data from a portable storage medium such as an optical disk, in which data is recorded so as to be readable with reflection of light, or a universal serial bus (USB) memory, for example. In the case where the drive device 106 is an optical drive device, for example, data is read from an optical disc 200 with laser light or the like. Examples of the optical disc 200 include Blu-ray (registered trademark), digital versatile disc (DVD), DVD-RAM, compact disc read only memory (CD-ROM), compact disc recordable (CD-R), and compact disc rewritable (CD-RW).

The communication interface 107 is connected to a network 50. The communication interface 107 communicates data with other computers and communication devices over the network 50.

With the above hardware configuration, the processing functions of the present embodiment are implemented. In addition, the AI image processing apparatus 6d may be designed to entirely control the image processing system 100, such as controlling the air volume of the first air blower 3 and controlling the laser emission timing of the laser light emitting device 4.

The AI image processing apparatus 6d having the hardware configuration illustrated in FIG. 3 has the following functions.

Figure 4:
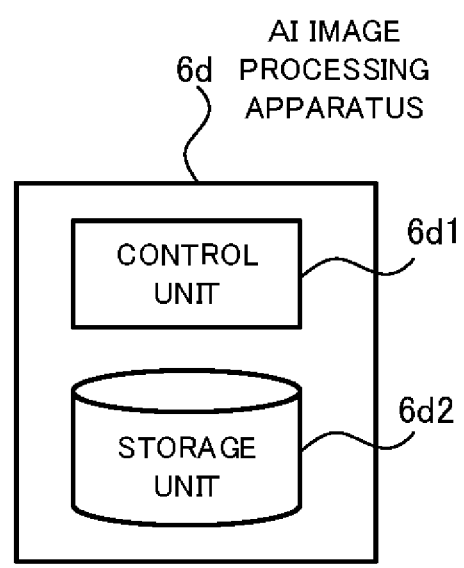
FIG. 4 is a block diagram illustrating functions of the AI image processing apparatus according the embodiment.

FIG. 4 is a block diagram illustrating functions of the AI image processing apparatus according to the embodiment.

The AI image processing apparatus 6d includes a control unit 6d1 and a storage unit 6d2.

The control unit 6d1 measures the lengths of the four sides a1, a2, a3, and a4 of a paper piece 10, for example, up to a nanometer scale on the basis of an image of the paper piece 10 received from an imaging unit 6e or 6f. Then, the control unit 6d1 gives a unique ID to the image received from the imaging unit 6e or 6f and stores the ID and the lengths of the four sides a1, a2, a3, and a4 in association with each other in the storage unit 6d2.

FIG. 5 is a view for explaining an example of information that is stored in the storage unit.

The information is stored in tabular form in the storage unit 6d2 of the embodiment.

The data management table T1 illustrated in FIG. 5 has the following columns: ID, First Side, Second Side Third Side, Fourth Side, Status, and File Name. Information items arranged in a horizontal direction are associated with each other.

The ID column contains an ID.

The First to Fourth Side columns each contain the length of a side of a paper piece 10 in units of nanometers. Any side may be taken as the first side. For example, as illustrated in FIG. 2, the upper side may be taken as the first side, and the second to fourth sides may be determined clockwise.

The Status column contains a status (unprocessed or processed) indicating the processing status of a restoration process to be described later.

The File Name column contains the file name of an image file associated with the corresponding ID.

The following describes how the image processing system 100 operates.

When paper pieces 10 are put in the box case 1 and the box case 1 is closed with the lid 1a, the first air blower 3 is powered on to blow air. Since the box case 1 closed with the lid 1a has a closed space inside, the air blown by the air blower 3 hits here and there and ends up passing through the duct 5 and reading unit 6 and then being exhausted outside. The air flow generated by the air makes the paper pieces 10 fly up (move upward).

Each paper piece 10 has a different weight according to its size and shape. In general, paper pieces 10 that are light or are likely to get air resistance are easy to fly higher. It is preferable that the air volume of the first air blower 3 is low at first and then gradually increases. This makes it possible to let light paper pieces 10 fly up first and then heavier paper pieces 10 fly up.

When detecting existence of a paper piece 10 on the basis of an image captured by the imaging unit 4a, the laser light emitting device 4 emits laser light to the detected paper piece 10 to thereby make a laser hole 10a of predetermined size in the paper piece 10.

The paper piece 10 that becomes lighter because of the laser hole enters the duct 5 through the opening 1d. That is to say, the laser light emitting device 4 functions as a moving unit that moves the detected paper piece 10 to a position (close to the second air blower 6a placed after the duct 5) where the second air blower 6a is able to lead the paper piece 10 to the housing 6c.

The second air blower 6a leads paper pieces 10 having entered the duct 5, one by one to the housing 6c and lets them through the housing 6c. The imaging units 6e and 6f capture images of the paper pieces 10 passing therethough the housing 6c. After passing through the housing 6c, the paper pieces 10 are exhausted outside the housing 6c by the third air blower 6b.

The control unit 6d1 measures the lengths of the four sides a1, a2, a3, and a4 of a paper piece 10 on the basis of an image of the paper piece 10 received from an imaging unit 6e or 6f as described above, for example, up to a nanometer scale. Then, the control unit 6d1 gives a unique ID to the image and stores the ID and the lengths of the four sides a1, a2, a3, and a4 in association with each other in the storage unit 6d2.

The image processing system 100 repeats the above operations until all the paper pieces 10 in the box case 1 are exhausted. In this connection, the image processing system 100 may have a detecting means to detect that no paper piece 10 is left in the box case 1. As the detecting means, a means to measure weight or a means to capture an image of no paper piece is considered. In addition, a timer may be provided to automatically stop the operations of the first air blower 3, second air blower 6a, and third air blower 6b after a predetermined time has passed.

The control unit 6d1 performs a restoration process at predetermined timing (for example, upon receipt of a restoration instruction from an operator operating the keyboard 105a or mouse 105b). The restoration process is performed at timing when all paper pieces 10 in the box case 1 have gone, for example.

Figure 6:
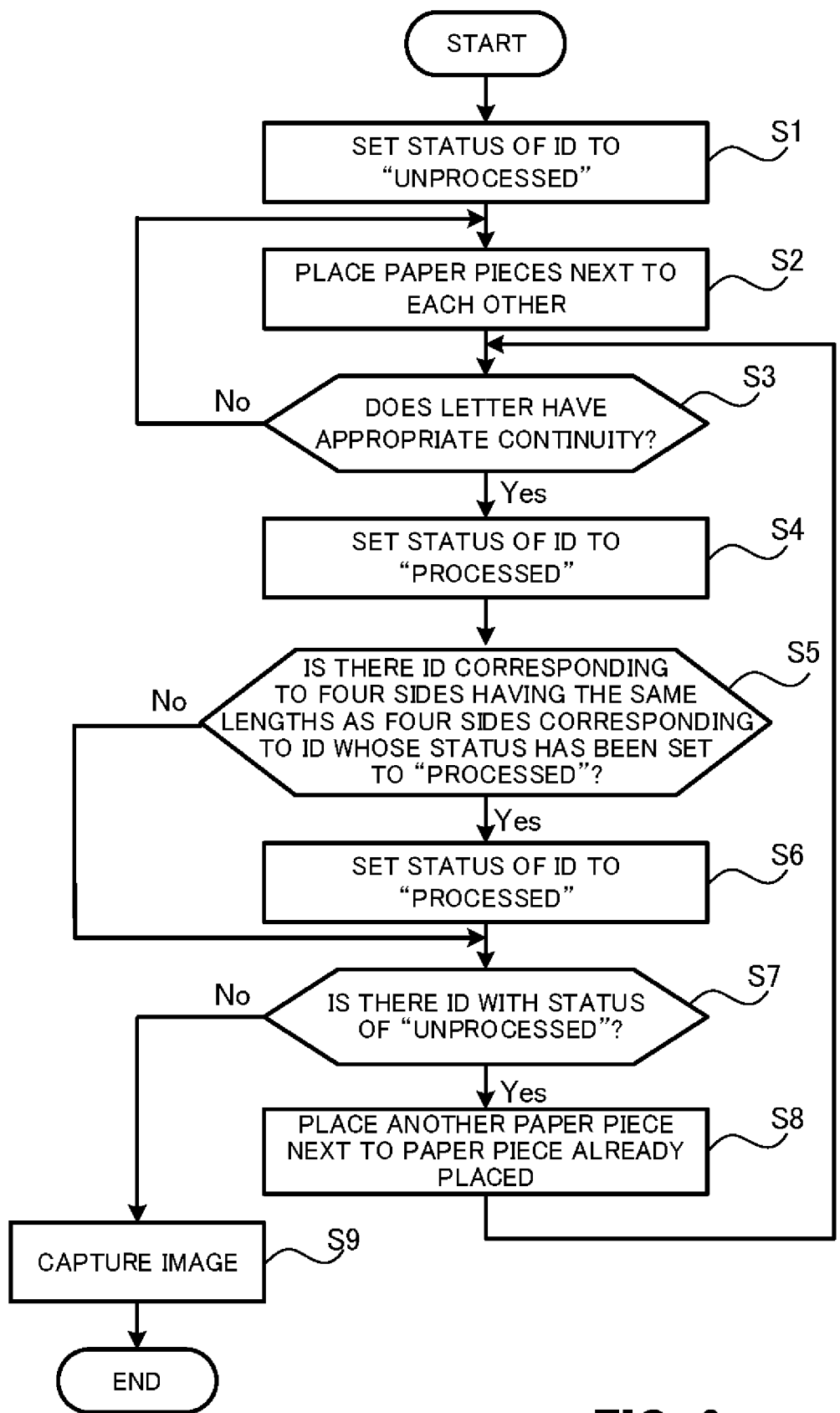
FIG. 6 is a flowchart for explaining an example of a restoration process.

FIG. 6 is a flowchart for explaining an example of a restoration process. The flowchart is just an example, and another process may be added or replace a part of the following process.

(Step S1) The control unit 6d1 sets the statuses corresponding to all IDs to "unprocessed" in the data management table T1. Then, the process proceeds to step S2.

(Step S2) The control unit 6d1 places, next to each other, paper pieces whose sides are recognized to have the same length as a result of AI-based image recognition. Then, the process proceeds to step S3.

(Step S3) The control unit 6d1 determines whether letters drawn on the paper pieces 10 placed next to each other as a result of the AI-based image recognition have appropriate continuity. If the letters have appropriate continuity (yes at step S3), the process proceeds to step S4. If the letters do not have appropriate continuity (no at step S3), then the process proceeds to step S2.

(Step S4) The control unit 6d1 sets, to "processed," the statuses corresponding to the IDs of the paper pieces 10 whose letters have been determined to have appropriate continuity. Then, the process proceeds to step S5.

(Step S5) The control unit 6d1 determines whether the data management table T1 has an ID corresponding to a combination of four sides that have the same lengths as the four sides a1, a2, a3, and a4 corresponding to an ID whose status has been set to "processed" at step S4. For example, assuming that the first to fourth sides corresponding to an ID whose status has been set to "processed" at step S4 are ⊚ nm, ⊚ nm, ⊚ nm, and ⊚ nm, respectively, a combination of the first side of ⊚ nm, the second side of ⊚ nm, the third side of ⊚ nm, and the fourth side of ⊚ nm is also considered to be a combination of four sides that have the same lengths as the four sides.

If an ID corresponding to a combination of four sides that have the same lengths as the four sides a1, a2, a3, and a4 of an ID whose status has been set to "processed" at step S4 is found (yes at step S5), the process proceeds to step S6. If no such an ID is found (no at step S5), the process proceeds to step S7.

(Step S6) The control unit 6d1 sets, to "processed," the status of the ID corresponding to the combination of the four sides that have the same lengths as the four sides a1, a2, a3, and a4 of the ID whose status has been set to "processed" at step S4. This is because either the front or rear side of a paper piece has been processed, it means the restoration of the paper piece is complete. Then, the process proceeds to step S7.

(Step S7) The control unit 6d1 determines whether the data management table T1 has any ID that corresponds to a status of "unprocessed.". If an ID with a status of "unprocessed" is found (yes at step S7), the process proceeds to step S8. If no ID with a status of "unprocessed" is found (no at step S7), then the process proceeds to step S9.

(Step S8) The control unit 6d1 places another paper piece 10 whose side has the same length as another side of one of the paper pieces placed next to each other at step S2, next to the one paper piece. Then, the process proceeds back to step S3 to repeat step S3 and subsequent steps.

(Step S9) The control unit 6*d*1 captures an image of what appears on the paper pieces placed next to one another, and displays the image on the monitor 104*a* or stores the image in the storage unit 6*d*2. Then, the restoration process of FIG. 6 is completed. In this connection, if there is an unclear part in the image, the control unit 6*d*1 may perform image processing to cure the unclear part.

In addition, in the embodiment, at step S8, a paper piece 10 whose side has the same length as another side of one of the paper pieces 10 placed next to each other at step S2 is placed next to that paper piece 10. Then, the process proceeds back to step S3. The embodiment is not limited thereto and in the case where an ID with a status of "unprocessed" is found at step S7, the process may proceed back to step S2 to repeat step S2 and subsequent steps.

As described above, the image processing system 100 of the embodiment includes the housing 6*c* that forms a passage through which paper pieces 10 pass, the imaging units 6*e* and 6*f* that capture images of the paper pieces 10 passing through the housing 6*c*, and the AI image processing apparatus 6*d* that restores the restoration target (document, book) on the basis of images captured by the imaging units 6*e* and 6*f* so that the contents of the restoration target become viewable.

The restoration process enables restoring a paper sheet, like a jigsaw puzzle, and displaying the same contents of the paper sheet as before cutting on the monitor 104*a*.

In addition, in the above-described embodiment, rectangular paper pieces are used. The embodiment may be applicable to a mixture of rectangle and polygon paper pieces. In this case, to find a combination of paper pieces that are to be placed next to each other, a variety of means may be possible to speed up this process, such as a means to combine paper pieces that have the same polygon shape (for example, in the case of a triangle paper piece, the other triangle paper pieces are searched preferentially to rectangular paper pieces).

In this connection, the process performed by the AI image processing apparatus 6*d* may be performed by a plurality of devices in a distributed manner. For example, one device may be designed to place a paper piece 10 whose side is determined to have the same length as a side of another paper piece 10 by the AI-based image recognition, next to the other paper piece 10, and another device may be designed to determine whether letters drawn on the paper pieces 10 placed next to each other as a result of the AI-based image recognition have appropriate continuity.

Heretofore, the analysis apparatus has been described with respect to the embodiment illustrated. The embodiment is not limited thereto, and the components of each unit may be replaced with other components having equivalent functions. For example, in the embodiment, the laser light emitting device 4 and second air blower 6*a* are used to lead paper pieces 10 one by one to the housing 6*c*. Alternatively, another means may be used to lead the paper pieces 10 one by one to the housing 6*c*.

In addition, other desired configurations and steps may be added to the embodiment.

The above-described processing functions may be implemented by using a computer. In this case, a program is prepared, which describes processes for the functions of the AI image processing apparatus 6*d*. A computer implements the above-described processing functions by executing the program. The program describing the intended processes may be stored on a computer-readable storage medium. Computer-readable storage media include magnetic storage devices, optical discs, magneto-optical storage media, semiconductor memories, and others. The magnetic storage devices include hard disk drives, flexible disks (FDs), magnetic tapes, and others. The optical discs include DVDs, DVD-RAMs, CD-ROMs, CD-RWs, and others. The magneto-optical storage media include magneto-optical disks (MOs) and others.

To distribute the program, portable storage media, such as DVDs and CD-ROMs, on which the program is stored, may be put on sale, for example. Alternatively, the program may be stored in a storage device of a server computer and may be transferred from the server computer to other computers over a network.

A computer which is to execute the above program stores in its local storage device the program recorded on a portable storage medium or transferred from the server computer, for example. Then, the computer reads the program from the local storage device and runs the program. The computer may run the program directly from the portable storage medium. Also, while receiving the program being transferred from the server computer over a network, the computer may sequentially run this program.

In addition, the above-described processing functions may also be implemented wholly or partly by using a digital signal processor (DSP), an application specific integrated circuit (ASIC), a programmable logic device (PLD), or other electronic circuits.

According to one aspect, it is possible to easily restore an object once it is cut.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

The invention claimed is:

1. A restoration apparatus comprising:
   a passage that allows cut-up pieces to pass therethrough, the cut-up pieces being made by cutting up a restoration target;
   an imaging unit that captures images of the cut-up pieces passing through the passage;
   a restoration unit that restores the restoration target, based on the images captured by the imaging unit, so that contents of the restoration target become viewable;
   a leading unit that blows air to lead the cut-up pieces one by one to the passage,
      wherein the restoration unit measures dimensions of the cut-up pieces, based on the images captured by the imaging unit, detects cut-up pieces to be placed next to each other, based on a result of the measurement, and determines whether a letter, an image, or a pattern drawn on the cut-up pieces placed next to each other has appropriate continuity;
   a box case in which the cut-up pieces are put;
   an air blower that blows air to move the cut-up pieces to a first position;
   a detecting unit that detects the cut-up pieces located at the first position; and
   a moving unit that moves the detected cut-up pieces to a second position where the leading unit is able to lead the detected cut-up pieces to the passage.

2. The restoration apparatus according to claim 1, wherein the moving unit has a damaging unit that loses a part of each of the detected cut-up pieces to reduce weights of the detected cut-up pieces.

3. An analysis system for restoring an uncut image of a whole article cut into several pieces, the system comprising:
- an image capture device in a passage configured to receive and image an individual piece of the several pieces;
- an image processor configured to,
    - measure, for each of the several pieces, a length of a plurality of sides of the individual piece received and imaged,
    - pair two pieces of the several pieces having matching lengths of a side determined from the measuring, wherein the pairing pairs the two pieces along the side,
    - determine whether the two pieces have image continuity when paired,
    - repeat the pairing and determining for each of the several pieces until the determining determines all paired pieces have image continuity, and
    - provide the uncut image, wherein the uncut image is the image of all the paired pieces having image continuity;
- a box case in which the pieces are put;
- an air blower that blows air to move the pieces to a first position;
- a detecting unit that detects the pieces located at the first position; and
- a duct that leads the detected pieces to a second position where the air blower is able to move the detected cut-up pieces to the passage.

* * * * *